United States Patent
Kasi et al.

(10) Patent No.: US 11,366,791 B2
(45) Date of Patent: Jun. 21, 2022

(54) SYSTEM AND METHOD FOR PROCESS AND AUTOMATION FRAMEWORK TO ENABLE ACCEPTANCE TEST DRIVEN DEVELOPMENT

(71) Applicant: JPMORGAN CHASE BANK, N.A., New York, NY (US)

(72) Inventors: Karthik Kasi, East Brunswick, NJ (US); Satish Kuchipudi, Hyderabad (IN); Anil Kumar Gannamani, Hyderabad (IN); Subbarao Gollapudi, Hyderabad (IN); Kamal Pande, Uttaranchal (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 39 days.

(21) Appl. No.: 16/599,909

(22) Filed: Oct. 11, 2019

(65) Prior Publication Data
US 2021/0109904 A1 Apr. 15, 2021

(51) Int. Cl.
G06F 16/21 (2019.01)
G06F 9/451 (2018.01)
G06F 16/25 (2019.01)
G06F 16/2452 (2019.01)
G06F 16/27 (2019.01)

(52) U.S. Cl.
CPC .............. *G06F 16/21* (2019.01); *G06F 9/451* (2018.02); *G06F 16/24522* (2019.01); *G06F 16/252* (2019.01); *G06F 16/254* (2019.01); *G06F 16/273* (2019.01)

(58) Field of Classification Search
CPC ............ G06F 16/5838; G06K 9/00201; G06K 9/00671; G06K 9/22
See application file for complete search history.

(56) References Cited

U.S. PATENT DOCUMENTS

2014/0188675 A1* 7/2014 Brown .................. G06Q 40/12 705/30
2017/0060969 A1* 3/2017 Dhayapule ............ G06F 16/254

OTHER PUBLICATIONS

Heusser, Testing the Extract, Transform, and Load Process in Data Warehouses, pp. 1-3, Jun. 26, 2017.*
Kazeeva, 10 Best Open Source Test Automation Frameworks for Every Purpose, pp. 1-6, Mar. 14, 2018.*

* cited by examiner

*Primary Examiner* — Albert M Phillips, III
(74) *Attorney, Agent, or Firm* — Greenblum & Bernstein, P.L.C.

(57) ABSTRACT

Systems and methods according to exemplary embodiments provide a process and automation framework enabling Acceptance Test Driven Development (ATDD) automation for Extract, Transform, and Load (ETL) and Big Data testing. Exemplary embodiments include a user interface for executing end to end tests as part of an ATDD process during ETL. The user interface may act as a shopping cart where the user only has to pick and choose the flavor of tests he/she desires to run (e.g., Pre-Ingestion, Post Ingestion, Data Reconciliation, etc.), and the feature files associated with the tests are dynamically generated.

6 Claims, 21 Drawing Sheets

| Pre Ingestion Checks 260 | Post Ingestion Checks 262 | Data Validation Checks 264 |
|---|---|---|
| SOR File Validations | Manifest file checks | Semantic file against the TD table validation |
| DDL Validations against TD | Marker file checks | Data Reconciliation(Table2Table) |
| Hadoop Folder structure checks | TDQ file checks | Table duplicate check |
| SOR file duplicate checks | File archival checks | File duplicate checks |
| DDL Validations against Oracle | Ingested file against table validations | DDL Validations against Oracle |
| Test data generation | SOR File against Ingested file checks | JSON file against Oracle & Cassandra table validations |
| | Control M Jobs | CDC Checks |
| | MDR lineage table checks | Reports validations |
| | Audit table checks in ODS | |

PRANA     👤 MARY JONES     ⇥ LOG OUT

<<

🏠 / Setup Test
○ Setup Test

🏠 Home
🗂 Dashb
📁 Repos
○ Setup
📊 Metrics

Edit Scenario — 1008     ✕

Step Name*

SOR and TOK File Validations

Unix Environment* unix15

Repeat for*

📄 Docum

| Test_Case_Id | LANDING_DIR | BUS_DATE | SOR_FILE | SOR_FILE_HEADER_COUNT | SOR_FILE_FOOTER_COUNT | SOR_FILE_DELIM |
|---|---|---|---|---|---|---|
| testcase_12 | test1 | test2 | test3 | test4 | test5 | test6 |

[ +ADD ROW ]

[ SAVE ]

PRANA     ▲ MARY JONES     ⇥ LOG OUT

<<   ⌂ / Setup Test

Edit Scenario — 1008     +ADD ROW — 1010    X

- ⌂ Home
- ⊕ Dashb[oard]
- ▦ Repos[itory]
- ○ Setup T[est]
- ⊕ Metrics

Step Name*
SOR and TOK File Validations

Unix Environment*
unix15

Repeat for*

| Test_Case_Id | LANDING_DIR | BUS_DATE | SOR_FILE | SOR_FILE_HEADER_COUNT | SOR_FILE_FOOTER_COUNT | SOR_FILE_DELIM | |
|---|---|---|---|---|---|---|---|
| testcase_12 | test1 | test2 | test3 | test4 | test5 | test6 | x |
| testcase_45 | test1 | test2 | test3 | test4 | test5 | test6 | x |

⊘ Docum[ent]

SAVE

PRANA　　　　　　　　　　　　　　  MARY JONES　　⊡LOG OUT

- << 
- ⌂ Home
- ▦ Dashboard
- ▤ Repository
- ○ Setup Test
- ⊞ Metrics
- ⓘ Documentation▲

⌂ / Setup Test
Setup Test

Test Plan

JIRA*
PRANA-275

PRANA Templates*
Preingestion Checks ▼

Feature File Name*
PreingestionCheck

Name*
PreingestionCheck

Dependent_scenarios*
NO

Environment*
QA

○ Setup Test

Steps executed

→ IMPORT DATA　　⇗ EXPORT DATA　　+ ADD SCENARIOS

○ Background [Configuration]　　[✎] [←] [→]　　[×]

Edit

○ SOR and TOK File Validations [Java]　　[ ] [←] [→]　　[×]

Feature File

Feature: PreIngestionCheck

```
# Scenario Number: 0
Background:
    Given the feature filename
    | Fields              | Value             |
    | name                | PreIngestionCheck |
    | dependent_scenarios | NO                |
    | Unix Environment    | QA                |

# Scenario Number: 1
Scenario Outline: SOR and TOK File Validations
    Given Test Case Id <Test_Case_Id>
    And Server ID is ''
    And a SOR file <SOR_FILE> with <SOR_FILE_
    When SOR and Token files are present in
    Then Row count in SOR file should match
    And SOR file column count should match with
    Examples:
    |Test_Case_Id|LANDING_DIR|BUS_DATE|SOR_
    |testcase_123|test1|test2|test3|test4|
```

PRANA

- « Home
- Dashboard
- ▪ Repository
- ○ Setup Test
- Metrics

1100

△ MARY JONES    ⬅ LOG OUT

△ / Dashboard
Dashboard

JIRA Tickets

| JIRA INSTANCE ▼ ⓘ | JIRA STATUS ▼ | ⟲ RESET |

You have selected instance ["jira10"] and status ["Open", "In Progress"]

- ★ PRANA-275 [Open]
  ○ Summary: PRANA CI
     Reporter: MARY JONES
     Assignee: BILL SMITH

- ★ PRANA-261 [In Progress]
  ☐ Summary: TREAT TOOL: User Documentation
     Reporter: MARY JONES
     Assignee: MARY JONES

- ★ PRANA-251 [In Progress]
  ☐ Summary: Metrics Generation - UI
     Reporter: MARY JONES
     Assignee: MARY JONES

- ★ PRANA-219 [In Progress]
  ☐ Summary: TREATS: Treats Deployment
     Reporter: BILL SMITH
     Assignee: MARY JONES]

- ★ PRANA-194 [Open]
  ☐ Summary: Video Demo on Treats Tool

ⓘ Documentation ▶

Test / Reports

Test Plans:    +ADD TEST PLAN

View test reports, Run prepared test plans or re-run old test plans from the list below.

| Test Plan Name | Created on | Status | Operations |
|---|---|---|---|
| PRANA-275_PreIngestionCheck_040518122500.feature | 2018-05-04 12:25:02.251 | Not Started | 📁 ⊘ 🗎<br>RUN<br>▲ TESTS |

PRANA

1100

<< 
🏠 Home
💻 Dashboard — 1102
📁 Repository
○ Setup Test

👤 MARY JONES    ⏏ LOG OUT    ❓

🏠 / Dashboard
Dashboard

JIRA Tickets

[SELECT JIRA ▼] [❓ SELECT STATUS ▼] [↻ RESET]

☆ ☐ PRANA-272 [Open]
  Summary: Add Scenario testing
  Reporter: MARY JONES
  Assignee: MARY JONES ☆ ☐ PRANA-268 [Open]
  Summary: TREAT TOOL: JQL Type Issue
  Reporter: MARY JONES
  Assignee: MARY JONES ☆ ☐ PRANA-251 [In Progress]
  Summary: Metrics Generation - UI
  Reporter: MARY JONES
  Assignee: MARY JONES ☆ ☐ PRANA-219 [In Progress]
  Summary: TREATS: Treats Deployment
  Reporter: BILL SMITH
  Assignee: MARY JONES ☆ ☐ PRANA-194 [Open]
  Summary: Video Demo on Treats Tool
  Reporter: MARY JONES
  Assignee: MARY JONES    — 1106

☆   PRANA-275 [Open]

❓ Help ▲

Test / Reports — 1104

Test Plans:    [+ADD TEST PLAN] — 1114

View test reports, Run prepared test plans or re-run old test plans from the list below.
                                                1108

| Test Plan Name | Created on | Status | Operations |
|---|---|---|---|
| PRANA-194_Test11_2018440_2.feature | 2018-02-13 21:33:25.575 | [Started] | 📁 ⊙ ✏ 🗑 |

SYSTEM AND METHOD FOR PROCESS AND AUTOMATION FRAMEWORK TO ENABLE ACCEPTANCE TEST DRIVEN DEVELOPMENT

FIELD OF THE VARIOUS EMBODIMENTS

Exemplary embodiments relate to providing a process and automation framework (PRANA) to enable Acceptance Test Driven Development (ATDD) automation for Extract, Transform, and Load (ETL) and Big Data testing.

BACKGROUND

Automating and testing data accuracy and integrity within end to end ETL flow is a challenging task. This task becomes more complex within a Big Data Ecosystem. There are no vendor tool available to automate the validation checks for end to end scenarios thus making the testing processing both manual and cumbersome. Further, overall there is a lack of matured vendor tools in the ETL automation testing space to enable ATDD. This is a major impediment to agile team velocity and process maturity. Regulatory and financial reports mandate zero tolerance reconciliation with a quick turn around and traceability/accountability. The current manual testing approach does not typically accomplish this objective.

These and other deficiencies exist. Exemplary embodiments solve these deficiencies.

SUMMARY OF THE VARIOUS EMBODIMENTS

An exemplary embodiment includes a system for Acceptance Test Driven Development (ATDD) automation for Extract, Transform, and Load (ETL) testing, having: at least one memory device; at least one processor communicatively coupled to the memory device and executing instructions including: presenting a user interface; receiving a selection of one or more options for data testing from the user interface; accessing a set of core automation libraries associated with the selection; generating a set of feature files associated with one or more data validation tests; storing the set of feature files in a cloud environment; executing, using the set of feature files, the one or more data validation tests; and generating results from the one or more data validation tests.

Another exemplary embodiment includes a computer implemented method for Acceptance Test Driven Development (ATDD) automation for Extract, Transform, and Load (ETL) testing with steps including: presenting a user interface; receiving a selection of one or more options for data testing from the user interface; accessing a set of core automation libraries associated with the selection; generating a set of feature files associated with one or more data validation tests; executing, using the set of feature files, the one or more data validation tests; and generating results from the one or more data validation tests.

Another exemplary embodiment includes a system for Acceptance Test Driven Development (ATDD) automation for Extract, Transform, and Load (ETL) testing having one or more system of records (SoR) data feeds; a data ecosystem located downstream of the one or more SoR data feeds and having: a data ingestion processor; a data reservoir for receiving data from the data ingestion processor, the data reservoir having: a semantic zone, configured to receive output from the data reservoir, for serving as a logical container for analytical workloads and receiving output from the data reservoir and producing load ready files, wherein the semantic zone provides a business representation of received data through application of one or more rules; and a report processor for extracting output reports from the data reservoir; and a data provisioning system for receiving output of the load ready files from the data ecosystem and outputting data to a data warehouse.

These and other embodiments and advantages will become apparent from the following detailed description, taken in conjunction with the accompanying drawings, illustrating by way of example the principles of the various exemplary embodiments.

BRIEF DESCRIPTION OF THE DRAWINGS

FIG. 2D depicts a high flow of test scenarios for pre-ingestion, post ingestion, and data validation in accordance with an exemplary embodiment.

FIG. 10A depicts a screen for configuration of a test plan in accordance with an exemplary embodiment.

FIG. 10B depicts a screen for configuration of a test plan in accordance with an exemplary embodiment.

FIG. 10C depicts a screen for configuration of a test plan in accordance with an exemplary embodiment.

FIG. 10D depicts a screen for configuration of a test plan in accordance with an exemplary embodiment.

FIG. 10E depicts a screen for configuration of a test plan in accordance with an exemplary embodiment.

FIG. 11A depicts a screen showing test status in accordance with an exemplary embodiment.

FIG. 11B depicts another view of the screen showing test status in accordance with an exemplary embodiment.

DETAILED DESCRIPTION OF THE PREFERRED EMBODIMENTS

Figure 1:
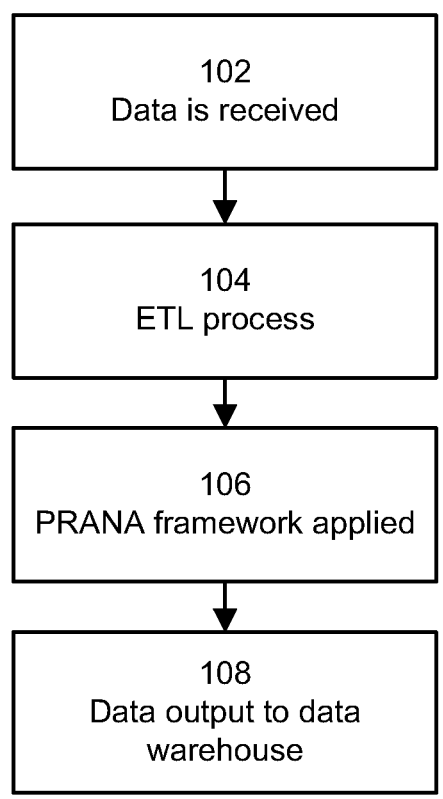
FIG. 1 depicts a method in accordance with an exemplary embodiment.

Various exemplary methods are provided by way of example herein. These methods are exemplary as there are a variety of ways to carry out methods according to the present disclosure. The methods depicted and described can be executed or otherwise performed by one or a combination of various systems and modules. Each block shown in the methods represents one or more processes, decisions, methods or subroutines carried out in the exemplary method, and these processes, decisions, methods or subroutines are not necessarily carried out in the specific order outlined in the methods, nor is each of them required.

Further, the various embodiments and their advantages may be understood by referring to the accompanying figures. It should be appreciated that the various examples in the attached figures are exemplary and non-limiting.

It will be readily understood by those persons skilled in the art that the embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements. While the various exemplary embodiments are described in the context of tokenized customer data, the methods and systems described herein may be applied to other related services involving interaction with similar devices.

The term "financial institution" as used herein, may include institutions that provide financial services to their members or customers. These institutions may include, but are not limited to banks, credit unions, trust companies, mortgage loan companies, insurance companies, investment banks, underwriters, and brokerage firms. The use of the term "financial institution" herein is meant to be exemplary and non-limiting.

As used herein, the term PRANA refers to an open source ATDD for ETL and Big Data application. The use of the term PRANA is meant to be non-limiting and is exemplary only. Further, the use of terms representing particular software or computer languages is meant to be exemplary and non-limiting. One of ordinary skill in the art would understand the references to the software and languages. It should be appreciated that other software or languages may be used. The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

According to exemplary embodiments, the heart of PRANA is a set of core automation libraries. According to exemplary embodiments, these libraries may be developed in Java and Spark/Scala. These automation libraries may support a myriad validations that may be categorized into phases such as "Pre-Ingestion", "Post Ingestion" and "Data Reconciliation".

While the Pre-Ingestion checks focus on ensuring the technical data quality in the incoming files, the automated Post Ingestion and Data Reconciliation validations via PRANA focus on ensuring the validity of the data in line with the expected business rules and transformations that are laid down upfront for each of the data marts.

The core automation libraries can perform functions to handle any kind of Unix operations, file management tasks, running and monitoring of the Control M workflows, provide database connectors for both traditional RDBMS and NOSQL Databases, as well as perform automated data reconciliations by triggering the Ab Initio graphs for the millions of records sent by the upstream applications.

According to exemplary embodiments, PRANA leverages Cucumber/Gherkin, an open source tool for implementing the ATDD/Behavior-Driven Development (BDD) approach, through which the linkage to the Core Automation Libraries happen via feature files. PRANA's architecture enables it to host the key validation components in a cloud environment so that its features can be shared across an enterprise as "micro services". The framework has been developed as a Java/Maven project and orchestrates well with the Jenkins Infrastructure to enable Continuous Integration and Deployment for respective agile teams. PRANA may use a Web UI wrapper such that a user can pick and choose the scripts based on the system under test and execute the scripts without any installations.

However, since individual agile teams may require a high degree of technical expertise to use this framework, a user interface (which may be referred to as the "PRANA UI") provides development teams a seamless way for executing all the end to end tests. The PRANA UI may act as a shopping cart from the user's perspective, where the user only has to pick and choose the flavor (type) of tests he/she desires to run (e.g., Pre-Ingestion, Post Ingestion, Data Recon, etc.), and the feature files associated with the tests are dynamically generated. The pseudo code behind the feature files interacts "under the hood" with the core framework to drive home the end to end tests. This user interface aka "over the hood" mechanism greatly simplifies the way and manner of creating and sequencing the ETL end to end tests in the overall development pipeline. Thus, exemplary embodiments enable the end user eventually to be shielded from the "nuts and bolts" of understanding the core framework and instead can focuses solely on building and running the tests that need to be executed.

The user interface of exemplary embodiments may be utilized to allow a user to interface with the system according to exemplary embodiments. Such user interface may include any hardware, software, or combination of hardware and software used by the processor that allows a user to interact with the system and/or a processor(s) of the computing. A user interface may be in the form of a dialogue screen, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information and to interact with the computing device. Accordingly, the user interface may be any system that provides communication between a user and the system or component(s) of the system. The information provided by the user through the user interface may be in the form of a command, a selection of data, or some other input, for example.

Advantages of PRANA include:
Prana offers a tool agnostic approach for data reconciliations by offering all data validations via the Spark/Scala libraries. This may eventually minimize the dependency on Ab Initio.
PRANA provides a way to propagate an open source framework approach allowing a variety of teams to build/enhance framework components.
PRANA enables to host the validation functions on a cloud environment as "micro services."
PRANA enables automated testing to integrate within a pipeline for ETL tools like Abinitio, and PL/SQL based applications.

PRANA enables nearly 60% of the unit test automation in the ETL space which is expected to bring in for 5% efficiency of overall application development effort per annum.

PRANA automates all test phases—Unit, Integration, UAT and production Validations certifying millions of records.

PRANA offers automatic script execution tracking and dashboards to track application/release quality trends with a rich integration of test execution results into ALM and JIRA.

PRANA, in usage testing, has bought about a 30% reduction of overall quality assurance efforts during an eight month period.

FIG. 1 depicts a method 100 in accordance with an exemplary embodiment.

At block 102, input data is received from the System of Records (SoR) of different lines of lines of business in the organization. The input data is ultimately destined for a data warehouse from which it can be used across the entire organization. For example, the data may originate from different lines of business within a financial institution such as the card division.

At block 104, the received data is put through an ETL process prior to being put into the data warehouse.

At block 106, the PRANA framework is applied. A quality assurance process is needed to be applied to the received data prior to it being stored in the data warehouse. For example, the data type and configuration must be checked so that it meets the requirements for storage in its destination. The PRANA framework according to exemplary embodiments is configured to conduct this testing. According to exemplary embodiments an acceptance test was written in the Gherkin language.

The PRANA framework sits within the ETL process between the data feeds on the input side and data warehouse on the output side. It ensures that data is properly transformed. PRANA framework maintains the integrity of all the data in the flow as well as validates the ETL code and can provide feedback to development teams to ensure that code is functioning correctly. PRANA is developed as an open source tool. Libraries can be developed as needed to fit any application. Customized code has been created within the framework using open source tools. The code can be used within an organization for development At block 108, the data is output from the ETL process and input to the data warehouse.

Figure 2A:
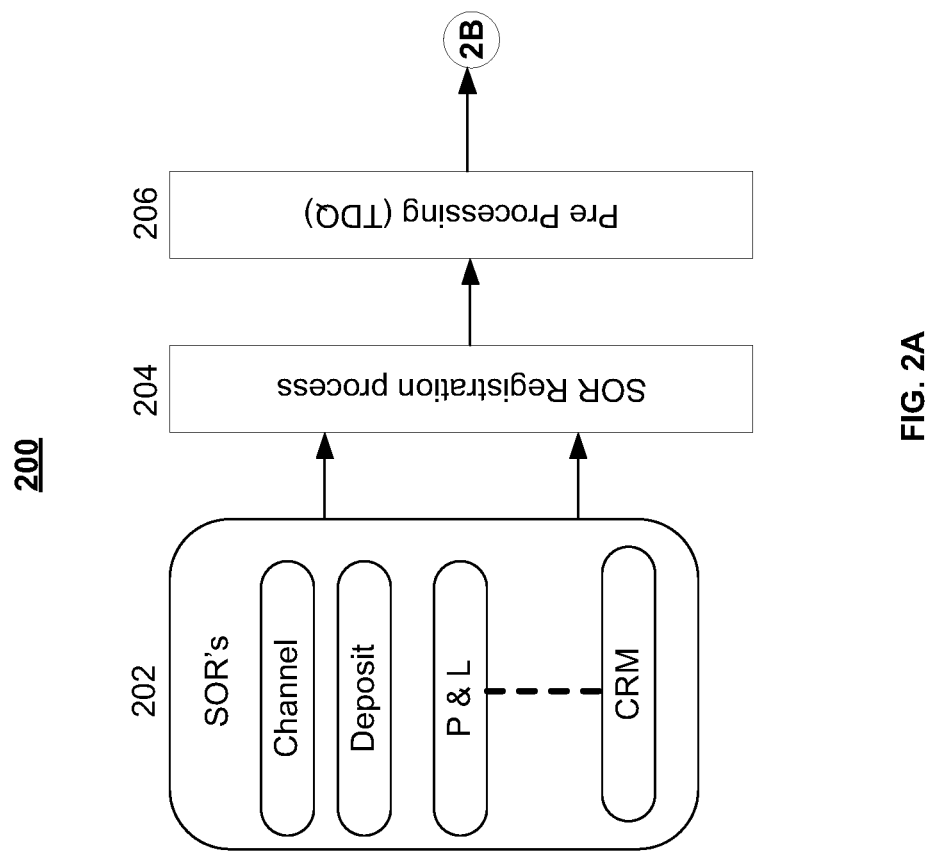
FIGS. 2A, 2B, and 2C depict an ETL life cycle flow in accordance with an exemplary embodiment.
Figure 2B:
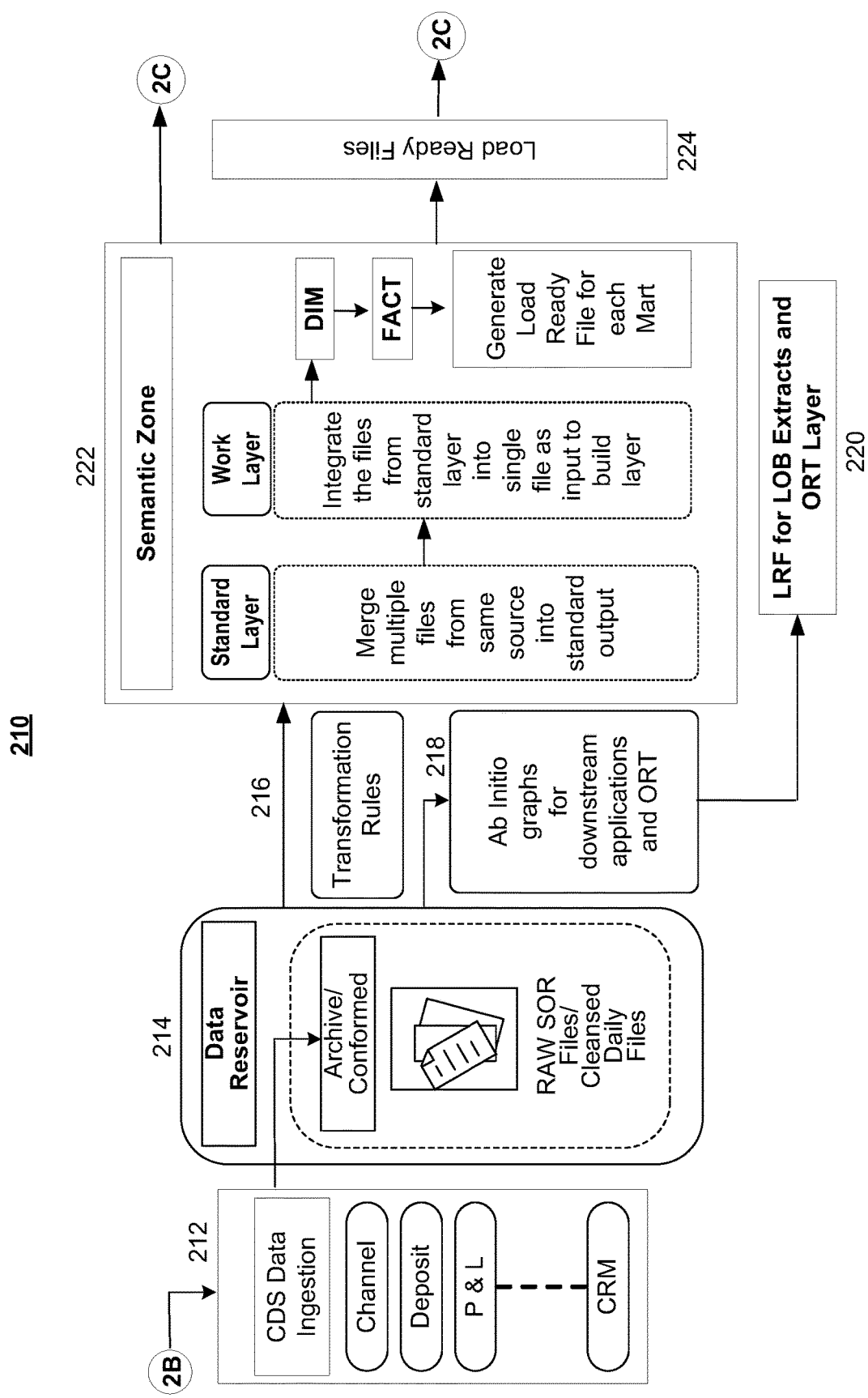
Figure 2C:
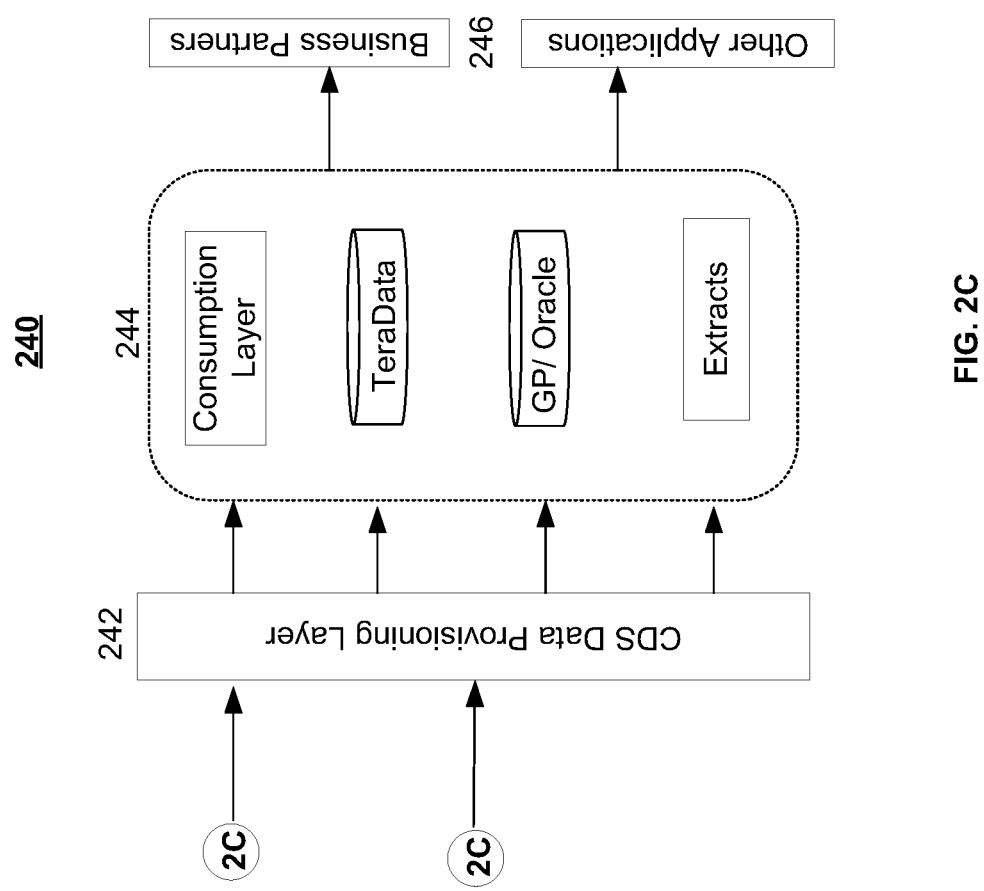

FIGS. 2A, 2B, and 2C depict an ETL life cycle flow in accordance with an exemplary embodiment.

FIG. 2A depicts the System of Records (SoR) 200 collected from multiple sources and registered in to the data reservoir and thereafter the cleansing the data. At 202, data is collected from multiple sources and SoRs. A data store is data about a given data domain like Banking is actively maintained (created and/or updated). The SoR may be a strategic sourcing designation for a data domain. A SoR may exist for every data element. These System of Records are received, according to exemplary embodiments, from multiple channels such as third parties, Web, from the clicks and impressions, digital marketing, etc. A system of records may contain data about the customers, transactions, profit and loss, deposits, credits, prospective customers, etc. For the process to understand the type of file or data that has come in, the SoR has to be registered in the reservoir. At 204, the registration process starts where it records the metadata of incoming data from SoR sources, including mapping, instructions and the target data path. It defines the type of business data received, the expected arrival time of the data and how to process it and includes information such as: who is sending it (source system, owner) and with what authority, how it will be delivered (real time, batch, API), when it will flow (start, frequency), what to process (entity, field information, column selections, filters, transforms, encryption, personal identifiable information, designation, etc.), where it will be stored and for how long, where and when it will be published. Registration ensures data sourced into the reservoir can be consistently cataloged, classified, protected, accessed and its life cycle managed. At 206, the data which is undergoes a pre-configured data quality check like the file format, date, field level checks like record format checks.

FIG. 2B depicts a data ecosystem 210. At 212, the pre-processed data from the SoRs is ingested. This data is then put into a data reservoir 214. Here, the data is archived and conformed as required. As depicted at 214, the Raw SoR files may be cleansed. At 216, transformation rules are applied to the data from the data reservoir 214. Additionally, output reports can be extracted at 218 from the data on in the data reservoir. At 220, the reports are output. The data is then run through a semantic zone 224. This zone outputs load ready files for the data warehouse. The semantic zone may be a logical container used for analytical workloads. It can hide the complexity of the underlying data by providing a business representation of the data, by applying the business driven rules. It provides data in a common consumption format for the business analyst and operations team to generate a report from the data. This report carries the data such as profit and loss, the report of new customers registered, etc., which may help the management to make the decision and build the plan of action for the upcoming business strategies.

Further, at 224, the transformed data enriched with business driven rules are extracted and loaded in to a file based on the frequency like daily, weekly, monthly and yearly. These extract files are called Load Ready files (LRF) which may then be used for analytical purpose in Business Intelligence (BI) tools, such as Cognos, Tableau, etc to build analytical reports. These files provides ease to archive the historical data in the data reservoir.

At 224, the historical data from the archival zone is processed through ab-initio to generate extract files to feed the Cross-LOB source data requirements for ETL process.

FIG. 2C depicts data provisioning 240. The data provisioning receives the outputs from the semantic zone and that data is run through a provisioning layer 242 before entering a consumption layer 244. After that, the data may be available to and may be accessed by business partners and other applications at 246.

FIG. 2D depicts a high level flow of test scenarios for pre-ingestion 260, post ingestion 262, and data validation 264 in accordance with an exemplary embodiment. These checks may be performed at the various points on the data from input to output. The Pre-Ingestion checks focus on ensuring the technical data quality in the incoming files. The Post Ingestion and Data Reconciliation validations focus on ensuring the validity of the data in line with the expected business rules and transformations that are laid down upfront for each of the data marts. These checks may be automated. The table below provides details on different exemplary test scenarios.

| Scenario | Description |
| --- | --- |
| SoR File Validations | Verify SoR and Taken file in terms of Business date, number of rows matching |
| DDL Validations against TD | Validate structure of the data matching with the table |
| Hadoop Folder structure checks | Validate if the correct folder structure is created |
| SOR file duplicate checks | Validate duplicates in SoR file |
| Test data generation | Generate the required test data automatically based on the format and data structure |
| Manifest file checks | Validating if manifest file is created |
| Marker file checks | Validate if Marker file created |
| TDQ file checks | Check technical data quality like null, special characters e.t.c |
| File archival checks | Check if the required file is archived |
| Ingested file against table validations | Validate Ingested file data with Database table |
| SOR File against Ingested file checks | Validate data between SOR and ingested file |
| Control M Jobs | run Control-M job Automatically |
| Semantic file against the TD table validation | Data validation between Semantic file with Table data |
| Data Reconciliation(Table2Table) | Data validation between Table to table |
| Table duplicate check | Check duplicate records in Table |
| File duplicate checks | Check duplicate records in file |
| DDL Validations against Oracle | Validate Data definition of a table with Oracle |
| JSON file against Oracle & Cassandra table validations | Data validation between Json and other Databases like Oracle and Cassandra |
| CDC Checks | Validate changes made to the data based on previous and current date |
| Scenario | Description |
| SoR File Validations | Verify SOR and Taken file in terms of Business date, number of rows matching |
| DDL Validations against TD | Validate structure of the data matching with the table |
| Hadoop Folder structure checks | Validate if the correct folder structure is created |
| SoR file duplicate checks | Validate duplicates in SOR file |
| Test data generation | Generate the required test data automatically based on the format and data structure |
| Manifest file checks | Validate if manifest file is created |
| Marker file checks | Validate if Marker file created |
| TDQ file checks | Check technical data quality like null, special characters e.t.c |
| File archival checks | Check if the required file is archived |
| Ingested file against table validations | Validate Ingested file data with Database table |
| SoR File against Ingested file checks | Validate data between SOR and ingested file |
| Control M Jobs | Run Control-M job Automatically |
| Semantic file against the TD table validation | Data validation between Semantic file with Table data |
| Data Reconciliation(Table2Table) | Data validation between Table to table |
| Table duplicate check | Check duplicate records in Table |
| File duplicate checks | Check duplicate records in file |
| DDL Validations against Oracle | Validate Data definition of a table with Oracle |
| JSON file against Oracle & Cassandra table validations | Data validation between Json and other Databases like Oracle and Cassandra |
| CDC Checks | Validate changes made to the data based on previous and current date |

Figure 3:
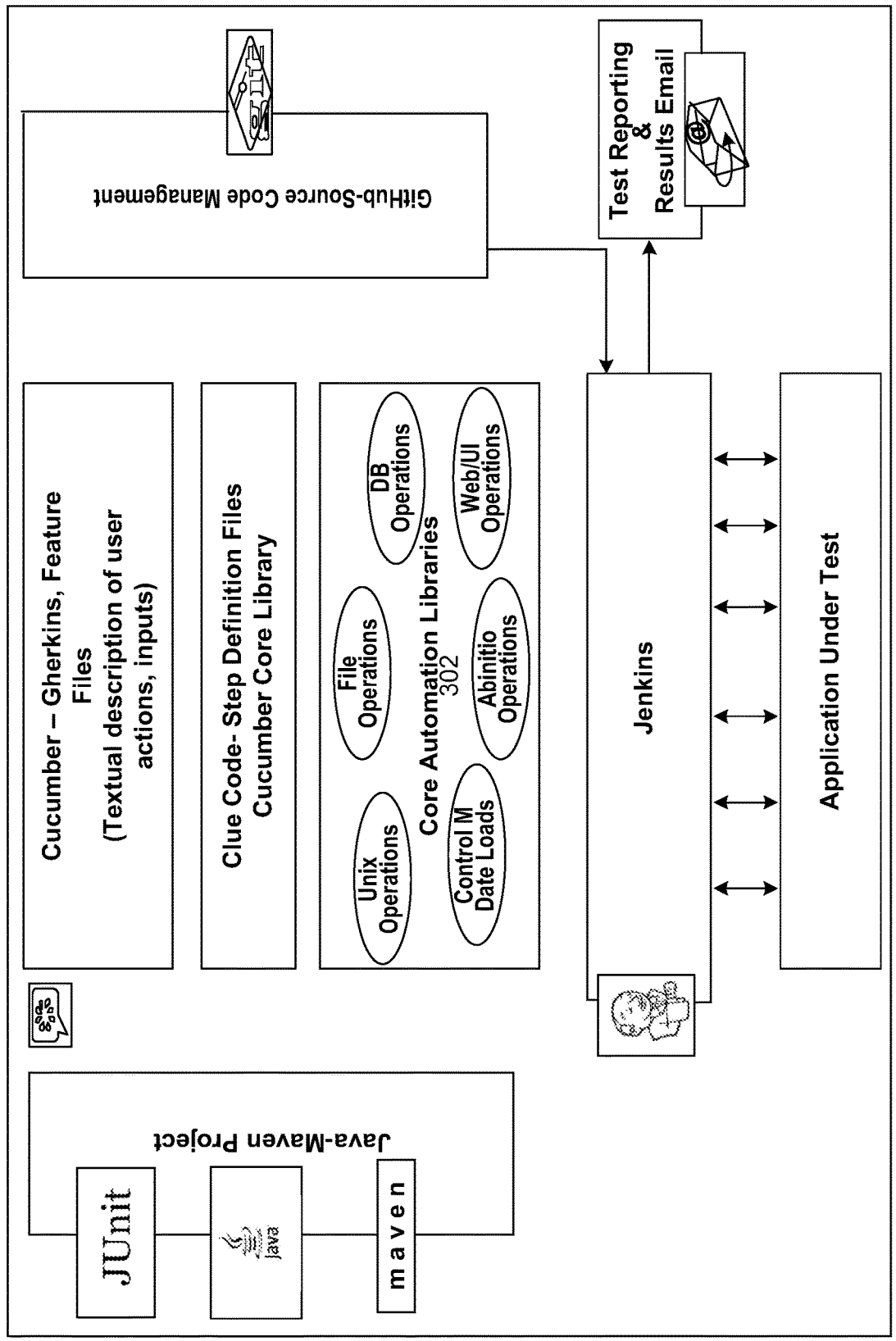
FIG. 3 depicts a unified automation framework to enable ATDD for ETL and Big Data applications in accordance with an exemplary embodiment.

FIG. 3 depicts a unified automation framework 300 to enable ATDD for ETL and Big Data applications in accordance with an exemplary embodiment.

A key feature of exemplary embodiments is a set of core automation libraries 302. These libraries, in exemplary developments, may be developed in Java and Spark/Scala. These automation libraries may support the various validations that are categorized into phases such as "Pre-Ingestion", "Post Ingestion" and "Data Reconciliation," such as those described above. While the Pre-Ingestion checks may focus on ensuring the technical data quality in the incoming files, the Post Ingestion and Data Reconciliation validations may focus on ensuring the validity of the data in line with the expected business rules and transformations that are laid down upfront for each of the data marts. The core automation libraries perform functions to handle any kind of Unix operations, file management tasks, running and monitoring of the Control M workflows, provide database connectors for both traditional RDBMS and NOSQL Databases, as well as perform automated data reconciliations by triggering the Ab Initio graphs for the millions of records sent by the upstream applications. Exemplary embodiments leverage Cucumber/Gherkin, an open source tool for implementing the ATDD/BDD approach, through which the linkage to the Core Automation Libraries happen via Feature files.

Figure 4:
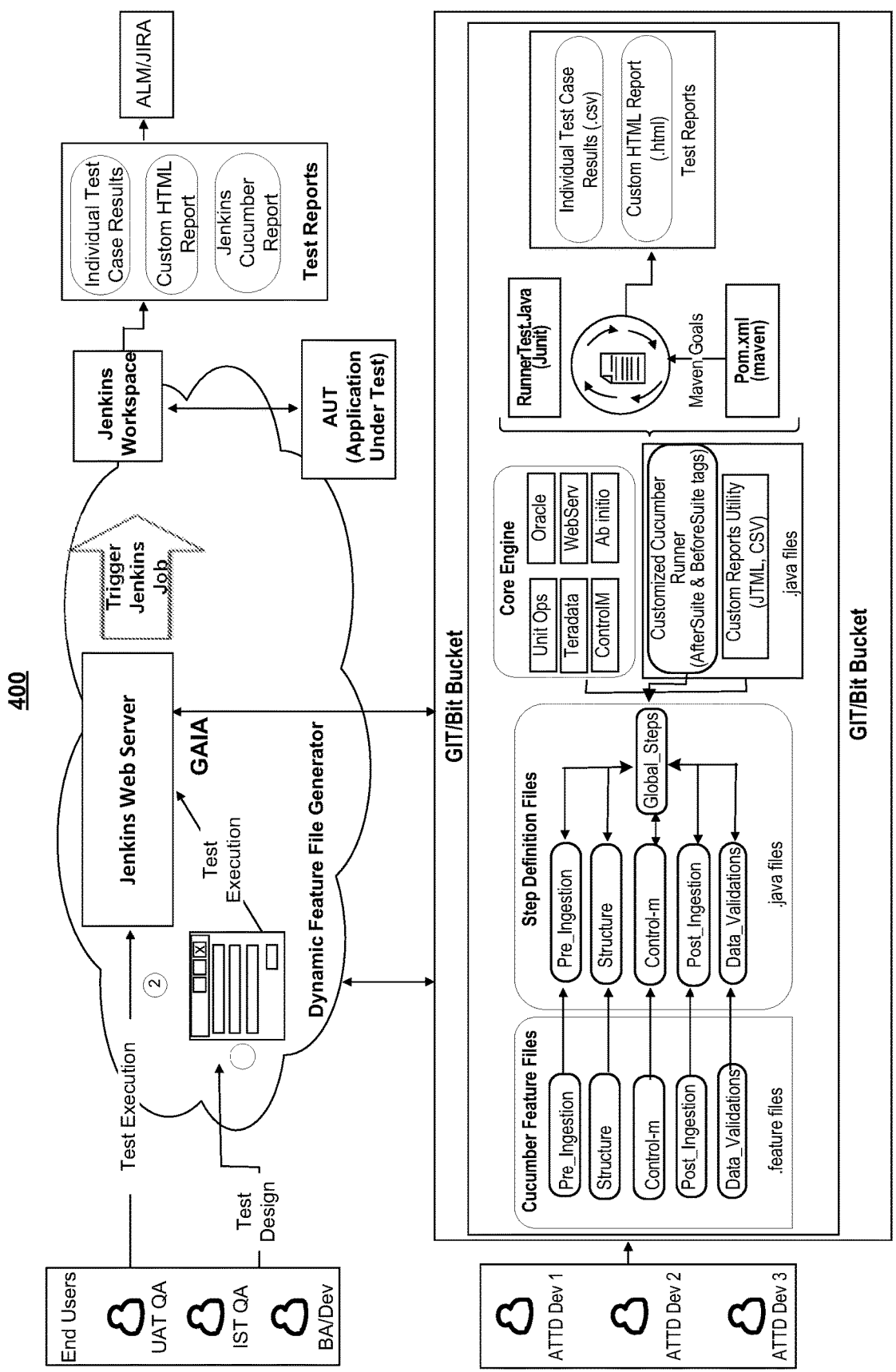
FIG. 4 depicts a cloud hosted architecture in accordance with an exemplary embodiment.

FIG. 4 depicts a cloud hosted architecture 400 in accordance with an exemplary embodiment.

Figure 5:
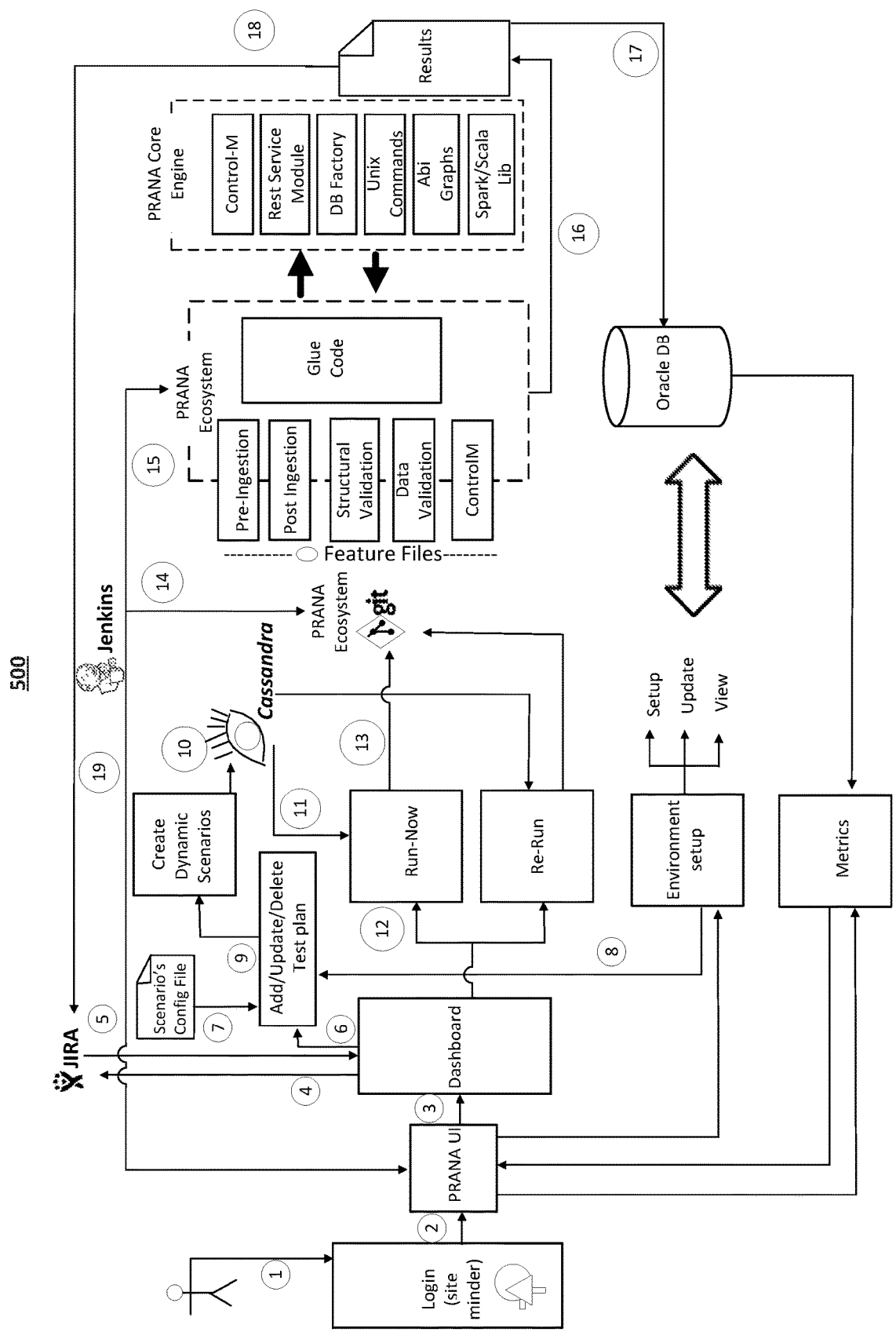
FIG. 5 depicts an architecture in accordance with an exemplary embodiment.

FIG. 5 depicts an architecture 500 in accordance with an exemplary embodiment. The architecture 500 depicts the flow of data and information in the system. At points 1 and 2, user authentication may be conducted via the user interface. At point 3, the user may navigate (following authentication) to a dashboard page. At points 4 and 5, user stories that are assigned to the user may be displayed. At point 6, a user story may be selected from that list and options such as "Add," "Delete," and "update test plan" may be selected. At point 7, a template may be selected and scenarios may be added or removed. At point 8, environment details and required parameters may be added to the scenarios by the user. At points 9 and 10, a dynamic scenario file may be created and inserted into a database. At point 11, the user may be routed to a test run screen with existing and new scenarios attached to the story. At points 12 and 13, a user may click on "Run Now" which inserts a feature file into Ecosystem GIT. At point 14, Jenkins polls the Ecosystem GIT to detect changes and triggers a build automatically. At point 15, as part of the build, a maven command is triggered which executes the scenario. At point 16, custom reports may be created and stored. The reports may be in a variety of formats, including, but not limited to, csv, xls and html. At point 17, execution details, including SID and scenario, may be inserted into Oracle for metrics. At point 18, a JIRA comment to the user story with the execution results and the feature file is uploaded into JIRA. A point 19, Jenkins may send the build status to the user interface.

Figure 6:
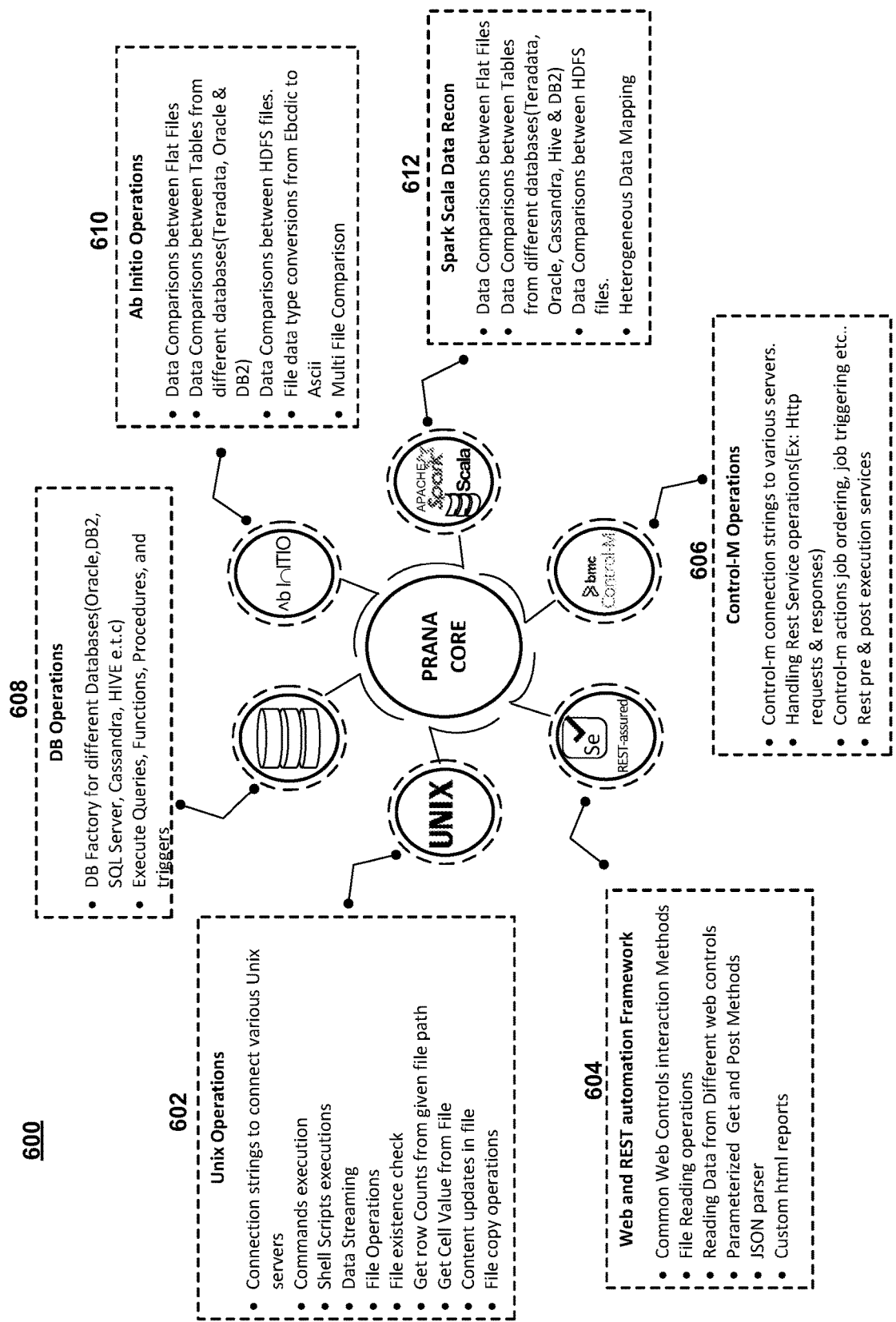
FIG. 6 depicts the functions of the core libraries in accordance with an exemplary embodiment.

FIG. 6 depicts the functions of the core automation libraries 600 in accordance with an exemplary embodiment. The core automation libraries 600 can perform functions to handle any kind of Unix operations, including file management tasks (602), performing web and REST automation, (604), running and monitoring of the Control M workflows or operations (606), provide database connectors for both traditional RDBMS and NOSQL Databases (608), as well as perform automated data reconciliations (610 and 612) by triggering the Ab Initio graphs for the millions of records sent by the upstream applications.

The core automation libraries have a common reusable code. The core library code may include the Java code which is used to call other commands and services. The commands can be a UNIX command or execute a shell script, etc. The libraries may the capability to consume any services which has been exposed by other applications. For example, whenever any data from a database or other data source is needed, a connection is established to the data source. Once the connection is established, various operations, such as fetching the records, adding/deleting data, etc., can be performed. Because there may be a need to connect to databases or other data sources for a variety of scenarios, rather than duplicating the code, a common set of reusable libraries are used—the core automation libraries.

The libraries depicted in the figure are meant to be exemplary and non-limiting as additional libraries are possible and may be developed as needed. The core engine is a combination of different modules which does specific related tasks. These tasks include, DB Operation (608): this module helps user to connect to different databases like Oracle, Teradata, etc. and get the data for comparison or other related activities; UNIX (602): this module has the common methods to connect to a UNIX environment and perform different operation like checking if a file exists, read a file, copy, execute a UNIX command, etc.; Web and rest automation (604): this module has different common methods to test a web based applications and has methods like enter text in a text field, retrieve text from a page, parsing a JSON file, etc.; Control-M (606): this module executes the control-M jobs that user wants to execute rather than going to a control M client; and Ab Initio (610) and Spark Scala reconciliation (612): these modules have common methods and graphs which have been designed to read, transform and compare data between different source and target like Hadoop, hive, Teradata, Oracle, etc.

Figure 7A:
FIG. 7A depicts a home page in accordance with an exemplary embodiment.

FIG. 7A is a depiction of a home page 700 according to exemplary embodiments. Upon accessing the system, a user may be landed on the home page. The home page may provide a variety of options or menus 702 to access different portions of the system. For example, options for accessing a dashboard, environment set-up, utilization summary metrics, utilization detail metrics, utilization savings metrics, and documentation may be presented. These options may be accessed either through a set of menu options or from a set of tiles (a set of tiles is depicted at 702). The home page 700 may include a menu bar 704. It should be appreciated that the names used in the various figures depicting the various screens are used solely for illustrative purposes of the exemplary embodiments.

Figure 7B:
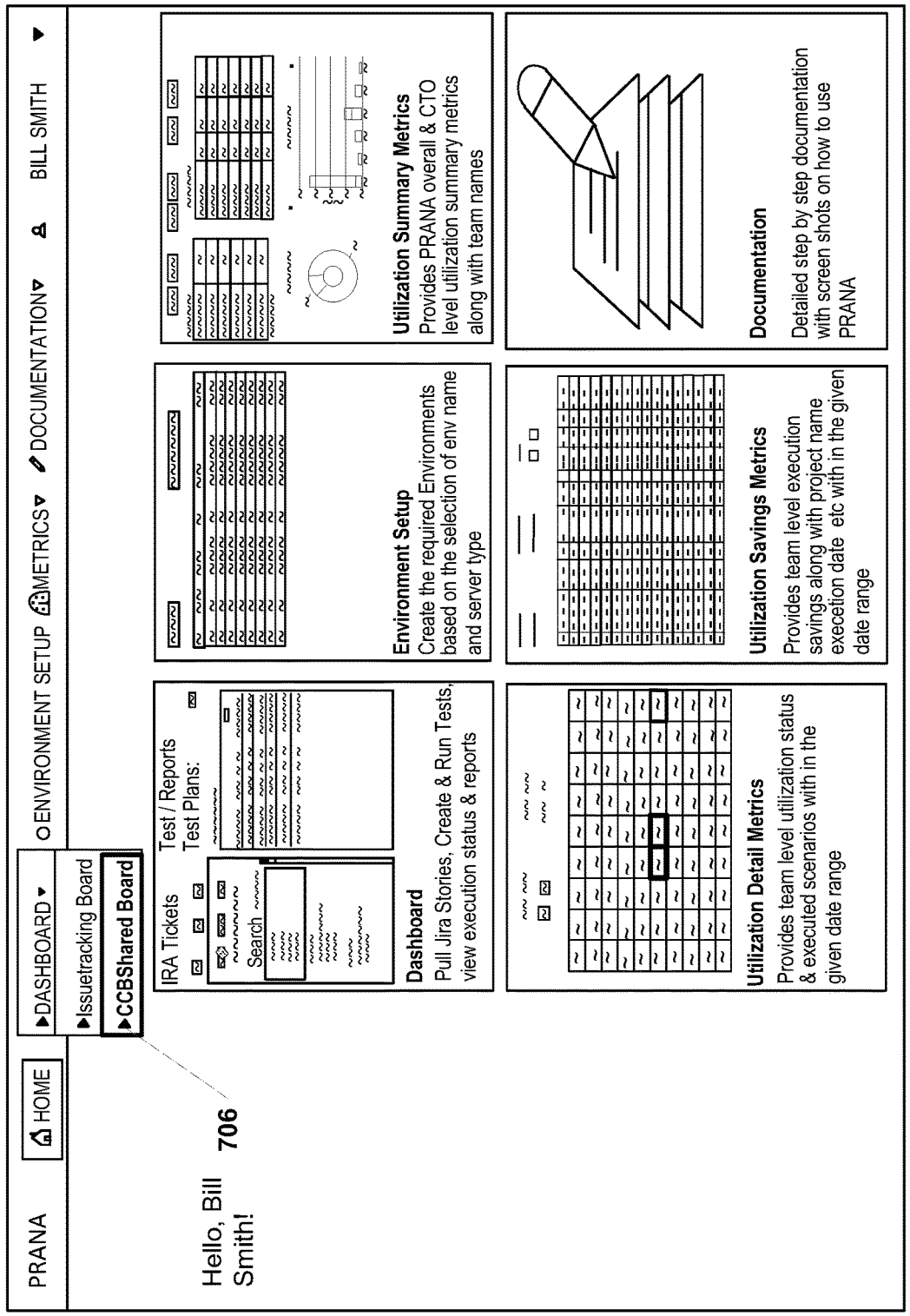
FIG. 7B depicts another view of the home page in accordance with an exemplary embodiment.

From the menu bar 704, the dashboard option 706 may be accessed as depicted in FIG. 7B.

Figure 8:
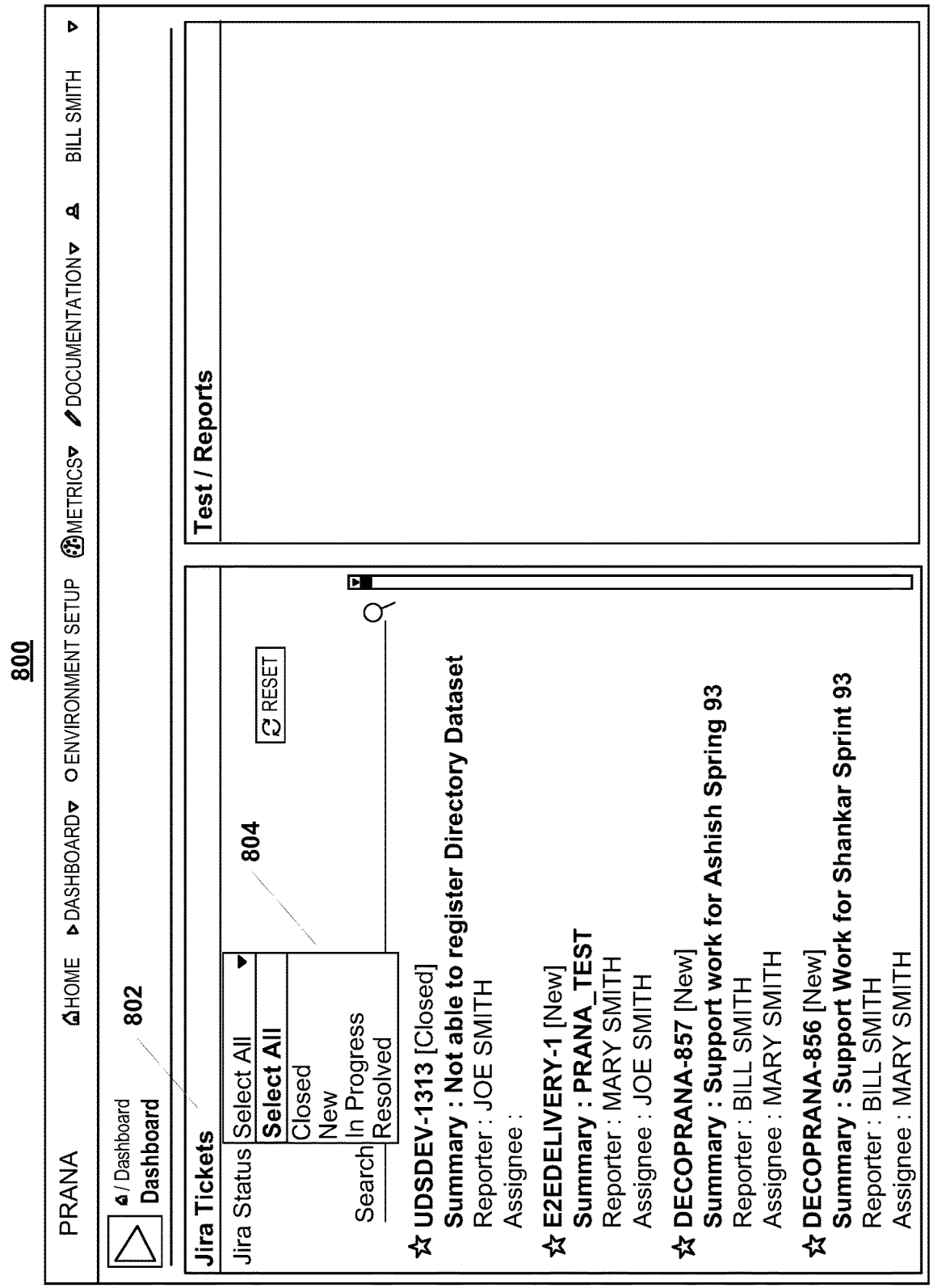
FIG. 8 depicts a screen with a listing of stories assigned to a user in accordance with an exemplary embodiment.

Upon accessing the dashboard option, the listing of all of the stories, or JIRA tickets, assigned to or reported by the user may be displayed as shown in FIG. 8 with the screen 800. Each JIRA may represent a user story. The listing 802 may include basic information about each story or ticket. Options to sort or filter the tickets based on status may be accessed at 804. JIRA is an issue tracking software that may be used with exemplary embodiments.

JIRA is an Issue and Project tracking tool. JIRA facilitates tracking of any kind of unit of work (e.g., an issue, bug, requirement or project task, etc.) through a predefined workflow. The requirements that are delivered within the projects of exemplary embodiments are tracked as a "JIRA Story." Each JIRA story may be referred to as a "User Story" and is a distinct requirement that is captured within exemplary embodiments, which once worked upon and closed, constitutes the minimal viable product that is planned to be delivered after every cycle.

Figure 9:
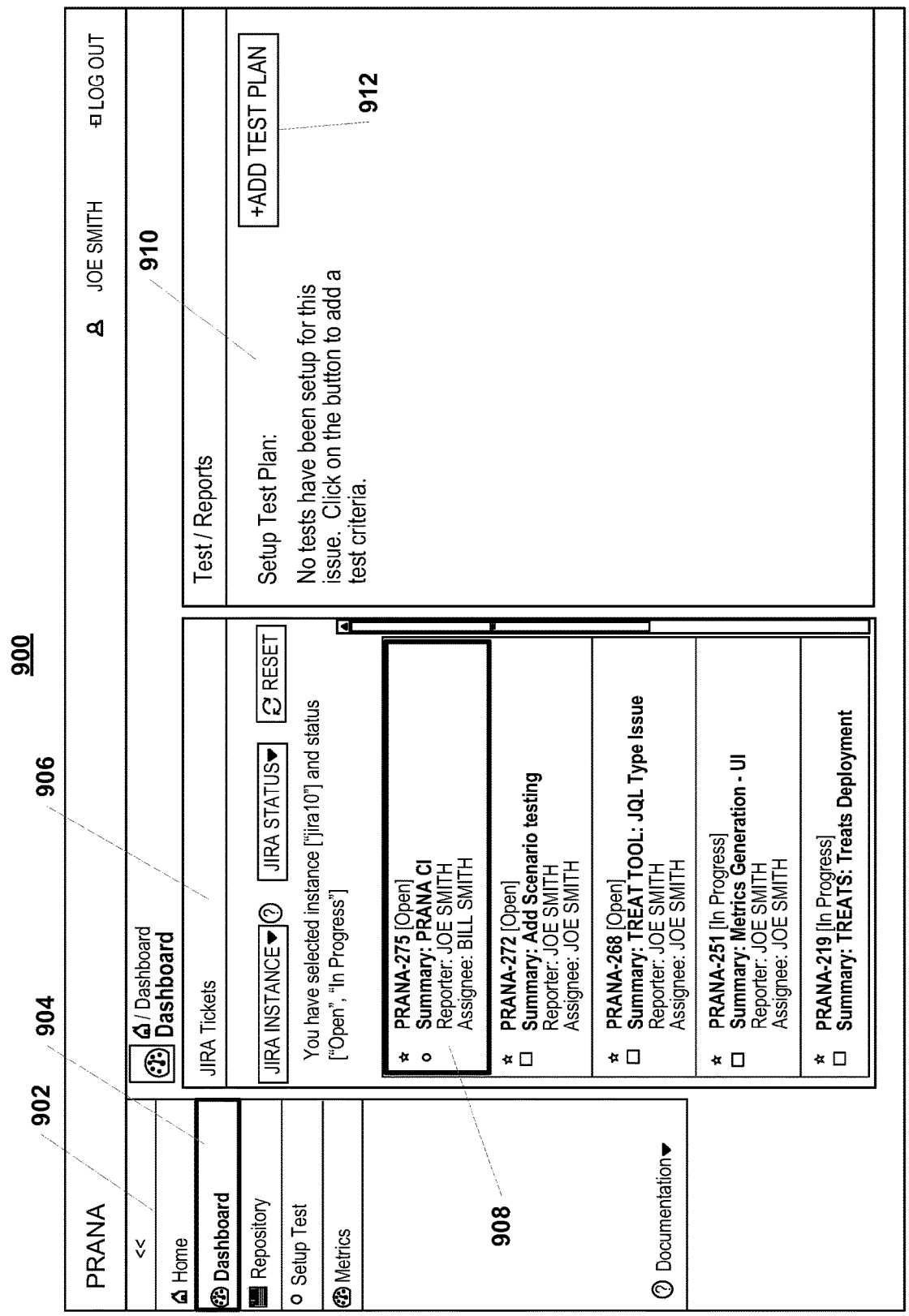
FIG. 9 depicts a view of a user interface in accordance with an exemplary embodiment.

FIG. 9 depicts another view of a user interface 900 according to exemplary embodiments. At 902, a listing of various options for selection may be displayed. The options may include: home, dashboard, repository, setup test, and metrics. In 900, the dashboard option is selected. The dashboard option 904 is selected. This option may cause a display of all the stories associated with the user at 906, similar to that described above in FIGS. 7B and 8.

A user can select a story, such as shown at 908. Once selected, a test/reports window 910 may appear with information on the story's test plan. In this window, an option to add test plan may be present, as shown at 912. This option may be selected. The test plan may then be configured.

Figure 10A:
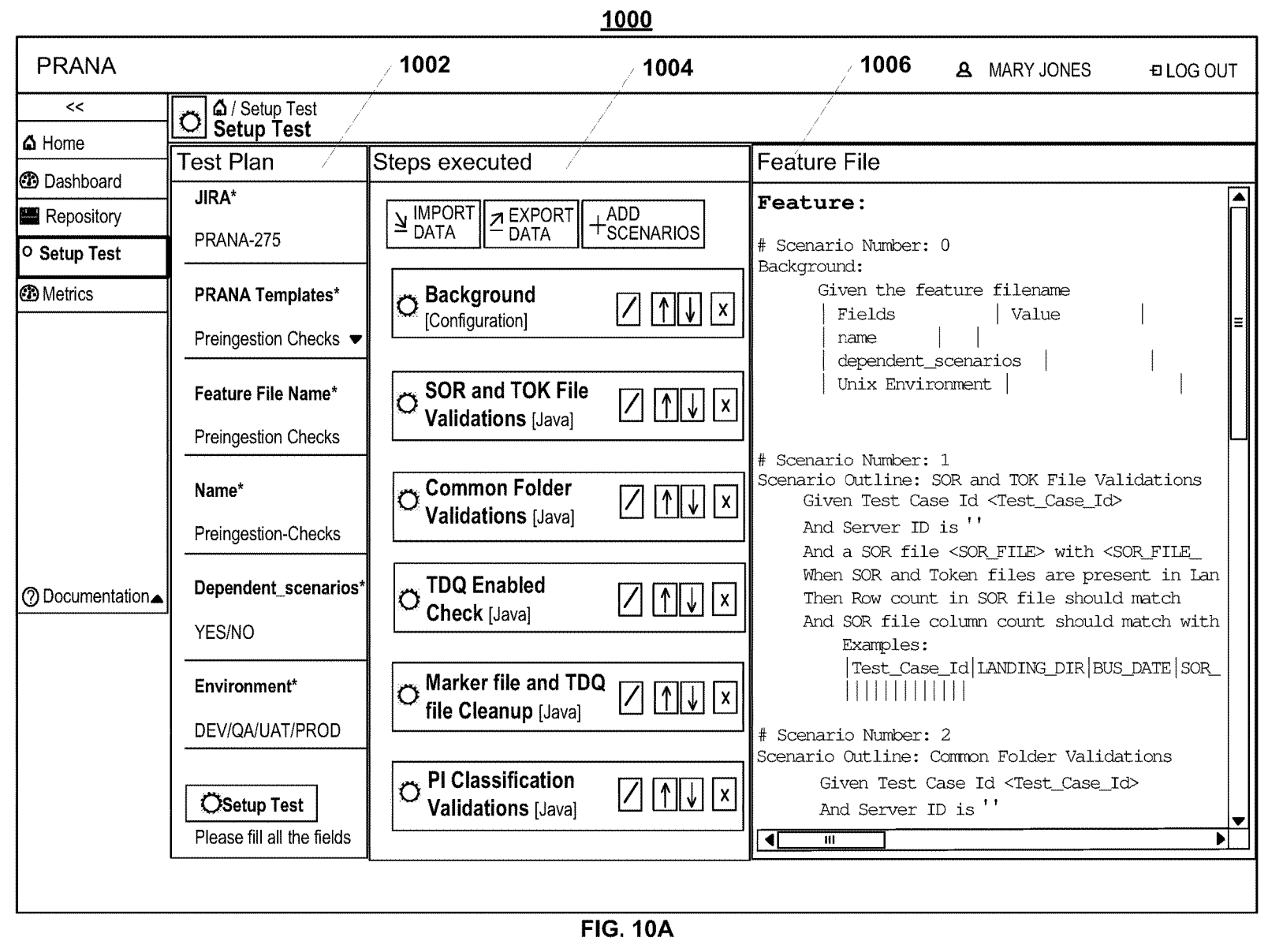
Figure 10B:
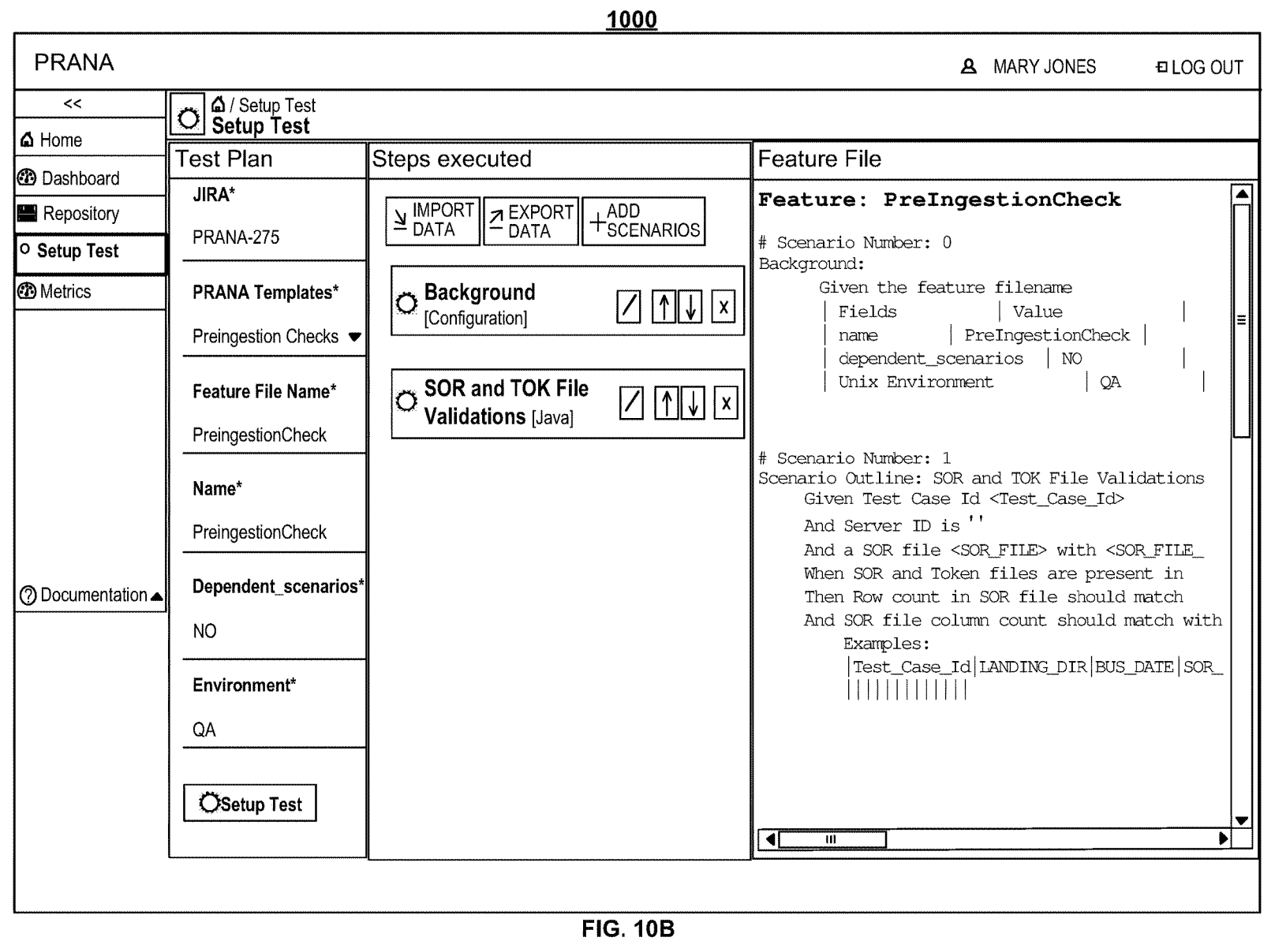

FIGS. 10A through 10E depict an exemplary configuration of the test plan with screen 1000. The screen 1000 may have different contents as depicted in the various figures. It should be appreciated that the various features depicted in these Figures are exemplary. Each stage of the test may be configured using a graphical user interface. A variety of different scenarios can be added or removed. Next, the various parameters for the test can be added. In various embodiments, multiple test cases for a single scenario can be added. The test plan can be reviewed. Once finalized, the user may be directed back to the dashboard page and the test plan that was created may be displayed against the story. FIG. 10A depicts various sections presented for test plan configuration. The test plan configuration may be set using the options at 1002. With a selection of each option at 1002, a listing of steps executed 1004 may be presented. Various options and parameters for each step may be configured. At 1006, the contents of the relevant feature file may be displayed. FIG. 10B depicts another view of the screen 1000. FIGS. 10C and 10D depict an edit scenario window 1008. In FIG. 10D, a second row has been added to the repeat for section using the add row button 1010. FIG. 10E depicts yet another view of the screen 1000.

The test may then be run. FIG. 11A depicts a screen 1100. "Run tests" may be selected at 1102 and the test may be initially scheduled. A validation may be started. Once completed, validation results may be displayed (e.g, "Pass" or "Failure"). This may trigger a status comment that is attached to the story. FIG. 11B depicts the screen 1100 showing the JIRA tickets (or stories) associated with the user at 1102. A test/reports section 1104 may provide information on a JIRA ticket (1106) selected in section 1102. The information provided may include the test plan name (1108), the created on date/time (1110), the status (1112), and selectable operations (1114). For example, in this depiction, the test plan has been started.

Figure 11C:
FIG. 11C depicts another view of the screen showing test status in accordance with an exemplary embodiment.

FIG. 11C depicts another view 1150 of test/report screen. The screen 1150 may have a section 1152 for JIRA tickets. This section may provide a listing of the stories belonging to the user. The screen 1150 may have a test/reports section 1154. This section may display the test plans for a story selected (1156) in section 1152. The JIRA tickets section 1152 may have option allowing for control of the specific tickets that are displayed. For example, the tickets may be filtered based on job status at 1158 (here, all tickets are displayed) and/or a specific ticket may searched for at 1160. The test/reports section 1154 may provide the test plan name (1162), a created on field with date and time information (1164), a status indicator (1166), build information (1168), and a section with operations (1170). The operations listed in 1170 can be selected. For example, as depicted, a "Run tests" or "Re-run tests" option may be selected. The other options may include viewing the test plan, deleting the test plan, editing the test plan, and sending the test plan to another user. These options may be selected via icons representing each action in the operations section (1170). Further, in various embodiments, the fields in section 1154 may be color-coded. For example, the status indicator (1166) may be color-coded green for success, red for failure, and gray for not started.

The foregoing examples show the various embodiments in exemplary configurations; however, it is to be appreciated that the various components may be configured in a variety of way. Further, it should be appreciated that the components of the various embodiments may be combined into one or more devices, collocated on a particular node of a distributed network, or distributed at various locations in a network, including being geographically separated, for example. As will be appreciated by those skilled in the art, the components of the various embodiments may be arranged at any location or locations within a distributed network without affecting the operation of the respective system.

As described above, the various embodiments of the present invention support a number of devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, application, or software.

It will be readily understood by those persons skilled in the art that the various embodiments are susceptible to broad utility and application. Many embodiments and adaptations other than those herein described, as well as many variations, modifications and equivalent arrangements, will be apparent from or reasonably suggested by the various embodiments and foregoing description thereof, without departing from the substance or scope of the various embodiments.

Accordingly, while the various embodiments have been described here in detail in relation to its exemplary embodiments, it is to be understood that this disclosure is only illustrative and exemplary of the various embodiments and is made to provide an enabling disclosure of the various embodiments. Accordingly, the foregoing disclosure is not intended to be construed or to limit the various embodiments or otherwise to exclude any other such embodiments, adaptations, variations, modifications or equivalent arrangements.

What is claimed is:

1. A system for Acceptance Test Driven Development (ATDD) automation for Extract, Transform, and Load (ETL) testing, comprising:
 one or more system of records (SoR) data feeds, the SOR data feeds comprising data collected from multiple sources comprising third party sources and the data being registered based on metadata and undergoing a quality check prior to being forwarded to a data ingestion processor, the data registration comprising recordation of metadata comprising mapping, instructions, and target data path;
 a data ecosystem located downstream of the one or more SoR data feeds and comprising:
  the data ingestion processor;
  a data reservoir to receive data from the data ingestion processor, the data reservoir comprising:
  a semantic zone to receive output from the data reservoir, the semantic zone comprising a logical container for analytical workloads and receiving output from the data reservoir and producing load ready files, and providing a business representation of received data through application of one or more rules; and
  a report processor to extract output reports from the data reservoir; and
 a data provisioning system to receive output of the load ready files from the data ecosystem and to output data to a data warehouse;
 at least one memory device;
 at least one processor communicatively coupled to the memory device and executing instructions comprising:
  presenting a user interface;
  receiving a selection of one or more options for data testing from the user interface, the data testing comprising one or more of pre-ingestion checks on the SoR data feeds and post-ingestion and data reconciliation validation;
  accessing a set of core automation libraries associated with the selection;
  generating a set of feature files associated with one or more data validation tests, wherein the set of feature files provide a linkage to the core automation libraries;

storing the set of feature files in a cloud environment;
executing, using the set of feature files, the one or more data validation tests; and
generating results from the one or more data validation tests.

2. The system of claim 1, wherein the core automation libraries are characterized into pre-ingestion, post-ingestion, and data reconciliation phases.

3. The system of claim 2, wherein each phase of the core automation libraries comprises a plurality of test scenarios.

4. The system of claim 3, wherein the core automation libraries perform a plurality of functions comprising: Unix operations, file management task, running and managing workflows, provide data connectors for different database types, and perform automated data reconciliations.

5. A system for Acceptance Test Driven Development (ATDD) automation for Extract, Transform, and Load (ETL) testing, comprising:
one or more system of records (SoR) data feeds, the SOR data feeds comprising data collected from multiple sources comprising third party sources and the data being registered based on metadata and undergoing a quality check prior to being forwarded to a data ingestion processor, the data registration comprising recordation of metadata comprising mapping, instructions, and target data path;
a data ecosystem located downstream of the one or more SoR data feeds and comprising:
the data ingestion processor;
a data reservoir to receive data from the data ingestion processor, the data reservoir comprising:
a semantic zone to receive output from the data reservoir, the semantic zone comprising a logical container for analytical workloads and receiving output from the data reservoir and producing load ready files, and providing a business representation of received data through application of one or more rules; and
a report processor to extract output reports from the data reservoir; and
a data provisioning system to receive output of the load ready files from the data ecosystem and to output data to a data warehouse.

6. The system of claim 1, wherein the SoR data feeds comprise feeds from a plurality of geographically dispersed systems.

* * * * *